Oct. 23, 1956
P. DE CAUSSEMAKER ET AL
2,767,433
APPARATUS FOR CURING FROTHED LATEX
Filed Oct. 30, 1952
2 Sheets-Sheet 1
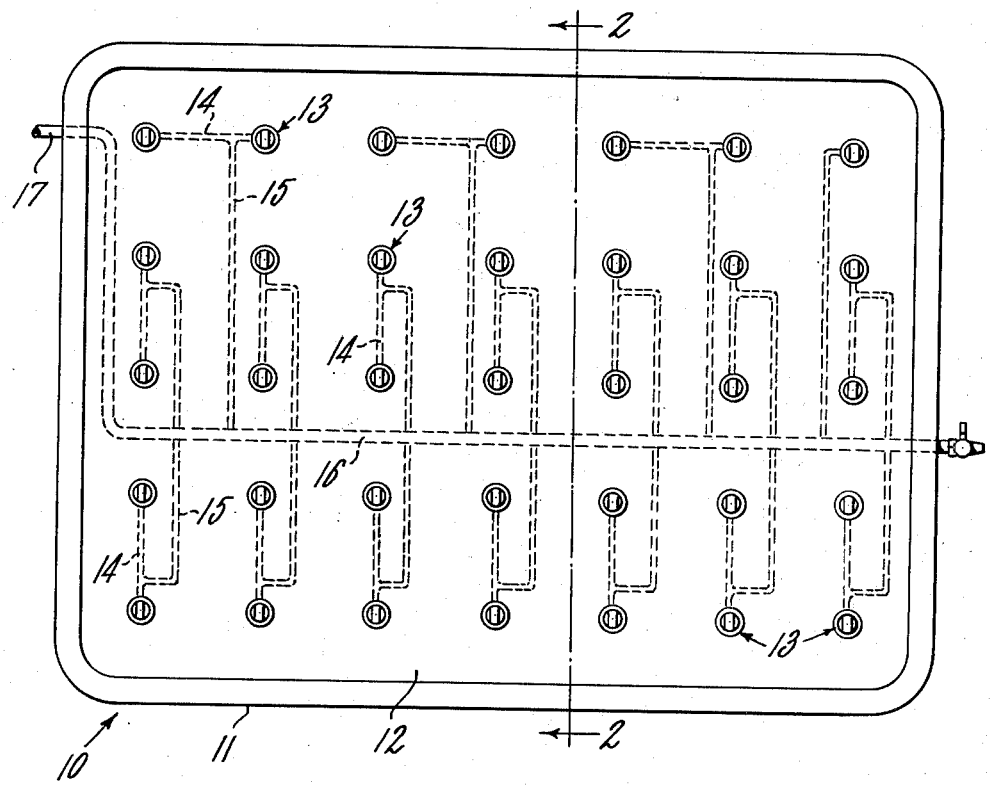
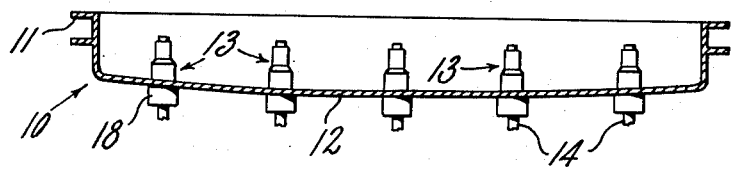
INVENTORS
PAUL DE CAUSSEMAKER
HAROLD A. THORNBURG
BY GUIDO J. BOFFARDI
Charles C. Willson
ATTORNEY

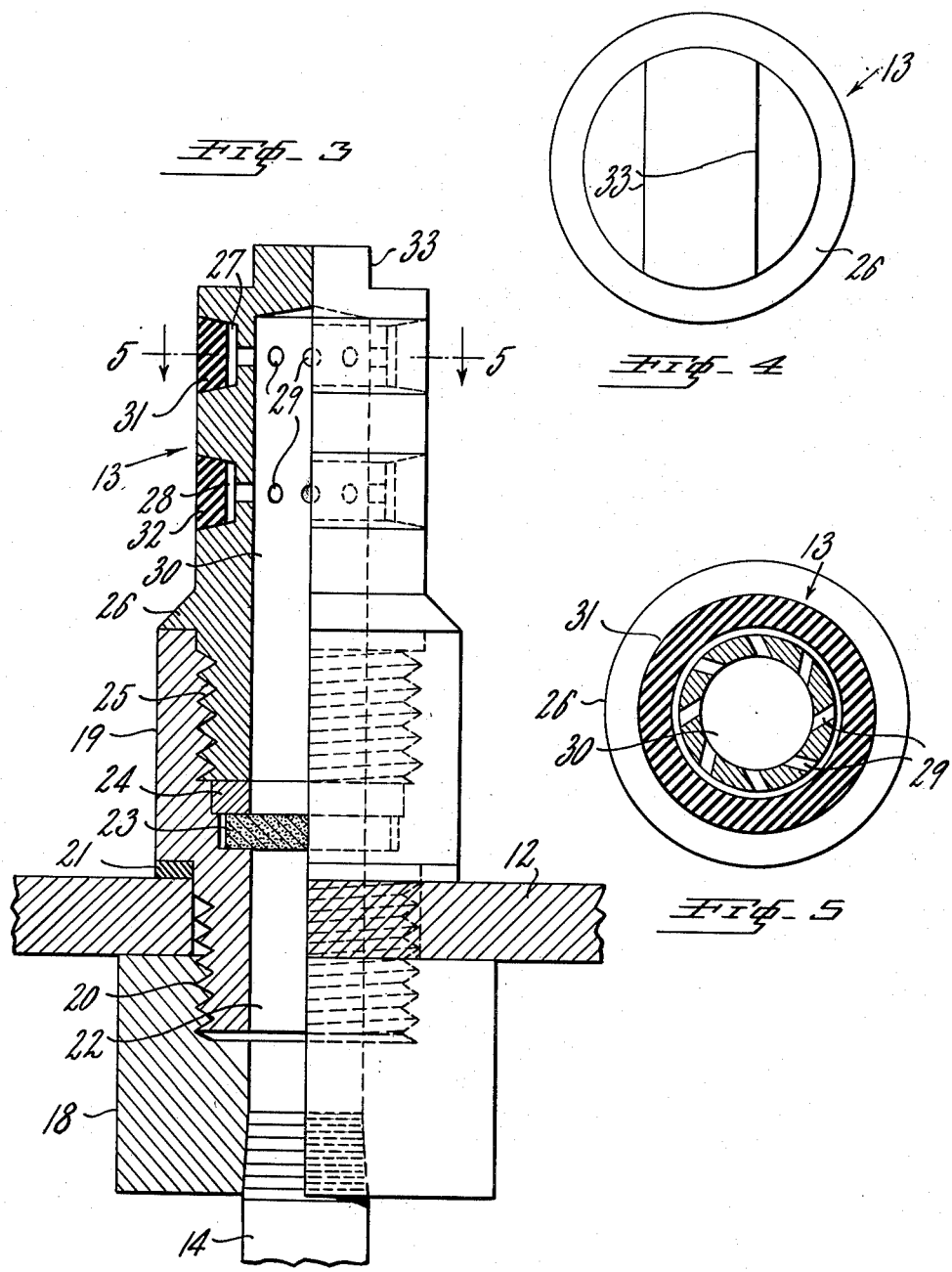

United States Patent Office 2,767,433
Patented Oct. 23, 1956

2,767,433

APPARATUS FOR CURING FROTHED LATEX

Paul De Caussemaker, Mishawaka, Ind., and Harold A. Thornburg, Brooklyn, and Guido J. Boffardi, Elmont, N. Y., assignors to United States Rubber Company, New York, N. Y., a corporation of New Jersey Application October 30, 1952, Serial No. 317,754

4 Claims. (Cl. 18—39)

This invention relates to apparatus for quickly vulcanizing sponge rubber such as frothed latex having interconnected cells, by forcing steam through the cellular structure to cure or vulcanize the frothed latex.

Sponge rubber or foam rubber formed of natural or synthetic latex has been produced for years by blowing or whipping a latex composition into a froth, converting the froth into any desired shape as by pouring into a vulcanizing mold, setting the froth in the mold to an irreversible pourous gel, and then vulcanizing by applying heat to the exterior of the mold, to thereby produce a molded sponge rubber article.

As freshly formed latex froth or latex foam approaches the gel stage the closed cells, formed in producing the latex froth, become interconnected and pervious to gases. This open cell structure can be quickly vulcanized by passing steam therethrough, as pointed out in the Lovell Patent No. 2,595,964, which discloses the use of hollow cores for introducing steam into the cellular mass at various points within the mold, so that the steam will travel through the cells and quickly heat the rubber and vulcanize the same.

If frothed latex is cured by passing steam therethrough as disclosed in the Lovell patent just mentioned, care should be taken to release the steam into the cellular mass under low pressure so that it will not blow away or crush the delicate latex cells. Care should also be taken to prevent the latex of the froth from entering the apertures or openings with which the cores are provided to release the steam into the latex froth, because if the latex enters these openings and solidifies therein it will clog them, and make it necessary to stop production from time to time to clean these openings.

Having in mind the foregoing, the present invention contemplates improvements in the apparatus disclosed in said Lovell patent, and more particularly improvements in the construction of the cores so that they will quickly cure the latex froth in a mold by introducing steam into the froth at various points to pass through the cellular foam and cure the same.

One feature of the present invention resides in a vulcanizing mold for frothed latex, comprising a molding receptacle having hollow cores projecting into the mold cavity at spaced points throughout the mold, and each of these cores is provided with an annular recess that encircles the core and communicates with the steam passage within the core. In this annular recess is mounted a snugly fitting elastic ring which is adapted to prevent the latex of the foam from entering the recess, but will yield when steam exerts a pressure against the inner face of the ring, so that this steam will escape at the edges of the ring and enter the latex froth.

Another feature of the present invention resides in the construction of the fittings employed to removably secure each steam supplying core in its operating position within the mold, and which fittings are so constructed that a core may be secured to the same and removed therefrom without disturbing the steam connection that supply steam to such core, and which steam connection may be located beneath the bottom wall of the mold where it is more or less inaccessible.

The present invention also contemplates novel means whereby a filter pad or filter disc adapted to filter the steam supplied to a core is removably secured adjacent such fitting at the base of the steam supply core.

The above and other features of the present invention will be further understood from the following description when read in connection with accompanying drawings; wherein Fig. 1 is a top plan view of the base or pan portion of a vulcanizing mold for a latex foam that is provided with cores for supplying curing steam to the foam at various points within the mold;

Fig. 2 is a sectional view taken on the line 2—2 of Fig. 1;

Fig. 3, on a larger scale, is a vertical sectional view through one of the steam supply cores shown in Figs. 1 and 2;

Fig. 4 is a top plan view of Fig. 3; and

Fig. 5 is a transverse sectional view taken on the line 5—5 of Fig. 3.

Figs. 1 and 2 of the drawings show the lower or pan portion of a latex foam curing mold. The removable upper or top portion of this mold is not shown. This pan portion of the mold designated by the numeral 10 is provided at its upper edge with an outwardly extending flange 11 upon which the mold top rests. The floor 12 of this pan 10 has extending upwardly therefrom a number of hollow steam supply cores 13, and these cores should be carefully positioned in the mold so that the steam that escapes therefrom will cure the frothed latex which fills the mold, uniformly throughout the cellular mass. Steam is supplied to each core 13, through connections to be described, by the steam pipes 14 that are connected by pipes 15 to a main supply pipe 16 which is connected by the pipe 17 to a source of supply, not shown. These pipes 14, 15 and 16 are shown dotted in Fig. 1 of the drawing because they are positioned below the floor 12 and are housed in a cradle or pan supporting structure, not shown.

Since the steam supply pipes 14 are disposed below the floor of the pan 10 and are therefore more or less inaccessible, it is desirable to provide means whereby each core 13 may be removed to clean or replace the same without disturbing the pipe connection 14. This is accomplished by providing below each core at the lower face of the floor 14 a fitting 18 which is internally threaded as shown in Fig. 3 and the upper face of this fitting is adapted to abut firmly against the lower face of the wall 12. This fitting is secured in place, in the construction shown, by providing inside of the mold pan 10 an adapter 19 the lower end portion of which is of reduced diameter and is threaded as indicated by 20. This threaded portion extends through a hole formed in the floor 12 and is screwed tightly into the threaded opening formed in the upper portion of the fitting 18. The parts 13, 18 and 19 are preferably made of aluminum, and a gasket 21 formed of a metal alloy softer than aluminum is preferably positioned as shown to provide a tight joint between the portions 12, 18 and 19.

The reduced lower portion 20 of the adapter has a steam passage 22 formed therein, and the adapter has a somewhat larger bore at the upper end of this passage 22 to receive a filter disc 23, such as a microporous filter formed of porous stainless steel or other porous material. This filter disc is held in place by a ring 24 formed of a relatively soft metal alloy, and this ring is secured in place by the engagement of the lower end of the core 13 therewith. The upper portion of the adapter 19 is internally threaded to receive the externally threaded portion 25 of the core 13, and this core is provided with an outwardly extending flange portion 26 that seats upon the top of the adapter 19. The arrangement is such that a core 13 may be screwed into and removed from an adapter 19 without disturbing the engagement of this adapter with its fitting 18 and supply pipe 14.

The core 13 has a novel construction for permitting the steam supplied to the interior thereof to escape from the core at various points and enter the surrounding latex foam, without permitting the sticky latex to enter and clog the steam discharge opening of the core. This desired result is secured, in accordance with the present invention, by providing the cylindrical shaped body portion of the core with one or more annular recesses formed to encircle the core, two such recesses being shown in Fig. 3 of the drawing. The upper recess is designated by 27 and the lower recess by 28 and each recess preferably has outwardly diverging sidewalls as shown. Steam is supplied to each of these recesses by a number of ports 29 that extend outwardly from the steam supply passage 30 of the core. These passages may be formed to extend outwardly in a radial direction, but are preferably inclined horizontally to such radial path as shown in Fig. 5, for a purpose to be described. Within the upper recess 27 is seated an elastic ring the side walls of which are inclined to conform to the taper of the side walls of the recess 27, and the lower recess 28 has seated therein a similar elastic ring 32. These rings may be made of neoprene or of a specially compounded rubber which will not be injured by the steam that contacts them. The top of the core 13 is preferably formed with the parallel side walls 33 adapted to receive a wrench used to screw the core into the adapter 19.

The outer wall of each ring 31 and 32 preferably lies flush with the outer wall of the core as shown, and the depth of the recesses 27 and 28 is greater than the thickness of the rubber rings 31 and 32 to provide a steam space therebetween as shown. The arrangement is such that these elastic rings will contract until their side walls abut against the inclined walls of the recesses as shown, to prevent the latex froth when it is poured into the mold from entering the recesses 27 and 28. When steam is supplied to the core passage 30 it will pass outwardly through the ports 29 to the passages just mentioned, and will expand the rings slightly to permit the steam to escape around the edges of such rings into the latex foam. The clearance space just mentioned between each ring and the base of the recess, permits the ring side walls to seat firmly in the recess as shown in the drawing. The ports 29 are preferably inclined as shown, so that as the steam passes therethrough it will spin or rotate these elastic bands to secure a more uniform escape of steam from beneath these bands, and also to break any bond that may tend to form between the latex foam and such bands. These rings will release steam upon a slight expansion.

The adapter 19 serves to support a core so that the core may be removed without disturbing the connections below the floor for supplying steam to the core, and also causes the core to project further into the interior of the mold than would be the case if the core were screwed directly into the fitting 18.

The microporous filter disc 23 serves to clean the steam that reaches the core, and to reduce the pressure of the steam supplied to the core so that when the steam is discharged into the foam it will have a pressure of not more than 1 or 2 pounds and will not displace the foam. This filter serves also to remove entrained water from the steam and to subdivide the water particles so that they will evaporate to supply dry, low pressure superheated steam to the core.

One elastic ring, such as 31, will be sufficient to supply steam to the latex foam, but two rings will give four circular positions of steam release to facilitate a more uniform distribution of steam throughout the foam mass to be cured, and the elastic properties of these rings causes them to seat tightly in the annular recesses 27 and 28 against the entrance of latex foam, when the foam is being introduced into the mold and at which time steam is not supplied to these cores.

Cores constructed in accordance with the present invention are relatively inexpensive to manufacture and release the steam satisfactorily into the latex foam. They also are non-clogging in that they prevent the tacky latex from entering the annular recesses from which the steam is discharged into the foam.

Having thus described our invention, what we claim and desire to protect by Letters Patent is:

1. A vulcanizing mold for frothed latex, comprising a molding receptacle having hollow cores projecting into the mold cavity, mechanism for supplying steam to the interior of said cores, each steam core having means for releasing this steam about the core into the latex froth, including an annular recess formed around the core and having inclined ports extending into the steam chamber of the core, and an elastic ring seated in said recess to exclude latex therefrom and adapted to expand outwardly and rotate in the recess under the action of steam as it escapes from said inclined ports into the latex froth, said inclined ports being operative to direct the steam to rotate said ring in said recess when the steam is escaping into the latex froth.

2. A vulcanizing mold for frothed latex, comprising a molding receptacle having hollow cores projecting into the mold cavity, mechanism for supplying steam to the interior of said cores, each steam core having means for releasing this steam about the core into the latex froth, including an annular recess encircling the core and having outwardly diverging sidewalls formed around the core and communicating with the interior of the core, an elastic ring trapezoidal in cross-section formed with its correspondingly inclined sidewalls seated in the recess, said ring having a width such that a chamber is provided between the bottom of the recess and the ring when said ring is in sealing engagement with the sidewalls of the recess, said ring being operable to exclude latex therefrom and to yield under the steam pressure and permit the steam to escape at its edges into the latex froth.

3. A vulcanizing mold for frothed latex, comprising a molding receptacle having hollow cores projecting into the mold cavity, mechanism for supplying steam to the interior of said cores, each steam core having means for releasing this steam about the core into the latex froth, including an annular recess having inclined sidewalls encircling the core and inclined ports communicating between the recess and the steam chamber of said core, an elastic ring of lesser thickness than the depth of the recess and formed with correspondingly inclined sidewalls to provide a steam space between said ring and the base of said recess within the recess, said ring having a flattened surface facing interiorly of said core, said ring being operable to exclude latex from the recess and to yield under the steam pressure and permit the steam to escape at its edges into the latex froth.

4. A vulcanizing mold for frothed latex, comprising a molding receptacle having hollow cores projecting into the mold cavity, mechanism for supplying steam to the interior of said cores, each steam core having means for releasing this steam about the core into the latex froth, including an annular recess formed around the core and having ports extending from said recess into the steam chamber of the core, said ports being inclined in a plane normal to the axis of said cores at an angle to a radius extending from the center of said core to said recess whereby the steam is directed to rotate a ring in said recess when the steam is escaping into the latex froth, and an elastic ring seated in said recess to exclude latex therefrom and adapted to expand outwardly (References on following page)

and rotate in the recess under the action of steam as it escapes from said inclined ports into the latex froth.

References Cited in the file of this patent

UNITED STATES PATENTS

| | | |
|---|---|---|
| 881,234 | Fusch | Mar. 10, 1908 |
| 2,595,964 | Lovell | May 6, 1952 |
| 2,611,926 | Grannis | Sept. 30, 1952 |
| 2,671,466 | Conrad | Mar. 9, 1954 |

FOREIGN PATENTS

| | | |
|---|---|---|
| 853,135 | Germany | Oct. 23, 1952 |